United States Patent [19]

Meguriya et al.

[11] Patent Number: 5,569,688
[45] Date of Patent: Oct. 29, 1996

[54] HEAT-CURABLE SILICONE RUBBER COMPOSITIONS

[75] Inventors: Noriyuki Meguriya; Takeo Yoshida, both of Usui-gun, Japan

[73] Assignee: Shin-Etsu Chemical Co., Ltd., Tokyo, Japan

[21] Appl. No.: 327,789

[22] Filed: Oct. 20, 1994

[30] Foreign Application Priority Data

Oct. 21, 1993 [JP] Japan .................. 5-285787

[51] Int. Cl.$^6$ .................. C08K 5/54; C08L 83/07; C08G 77/06
[52] U.S. Cl. .................. 524/188; 524/210; 524/211; 524/588; 524/714; 524/796; 524/862; 528/15; 528/22
[58] Field of Search .................. 524/862, 588, 524/714, 796, 188, 210, 211; 528/15, 22

[56] References Cited

U.S. PATENT DOCUMENTS

| | | | |
|---|---|---|---|
| 3,950,299 | 4/1976 | Itoh et al. .................. | 524/862 |
| 4,163,081 | 7/1979 | Schulz .................. | 428/429 |
| 4,785,047 | 11/1988 | Jensen .................. | 524/714 |

FOREIGN PATENT DOCUMENTS 577357  1/1994  European Pat. Off. .

*Primary Examiner*—Melvyn I. Marquis
*Assistant Examiner*—Karen A. Dean
*Attorney, Agent, or Firm*—Millen, White, Zelano & Branigan, P.C.

[57] ABSTRACT

To a heat-curable silicone rubber composition comprising (a) an organopolysiloxane having at least two alkenyl groups in a molecule, (b) an organohydrogenpolysiloxane having at least two hydrogen atoms in a molecule, and (c) a platinum catalyst is added (d) ammonia or an ammonia precursor so that ammonia or ammonia precursor is present in an amount of 10 to 500 parts by weight of nitrogen per million parts by weight of the total of components (a), (b) and (c) in a cured product of the heat-curable silicone rubber composition. The composition cures into a silicone rubber having minimized compression set without a need for secondary vulcanization.

14 Claims, No Drawings

HEAT-CURABLE SILICONE RUBBER COMPOSITIONS

BACKGROUND OF THE INVENTION

1. Field of the Invention

This invention relates to a heat-curable silicone rubber composition which cures into a silicone rubber having minimized compression set.

2. Prior Art

Silicone rubber compositions are well known which comprise a vinyl-containing organopolysiloxane, an organohydrogenpolysiloxane containing a hydrogen atom bonded to a silicon atom, a platinum catalyst, and an inorganic filler and which cure through addition reaction between the vinyl group and the hydrogen atom bonded to a silicon atom. Since these compositions are easy to mold and offer molded silicone rubber parts having excellent properties including heat resistance and electrical insulation, they are widely used in the application where such properties are required.

However, molded silicone rubber parts of this type are less resistant against compression and thus difficult to use as molded parts which are subject to compressive deformation for a long time, for example, rolls and connectors for automotive parts. One prior art technique for overcoming this drawback is by molding parts by press molding, injection molding or transfer molding and subjecting them to heat treatment or secondary vulcanization at a high temperature of 150° to 250° C., thereby improving compression resistance. This technique is based on the belief that molded silicone rubber parts can be improved in compression resistance by reducing the amount of unreacted functional groups remaining therein. This technique lowers operation efficiency because it requires the steps of placing once molded silicone rubber parts into a hot oven and heating over a long time. The final molded parts become costly.

Therefore, it is desired to have a silicone rubber exhibiting high compression resistance without the above-mentioned problem, that is, without a need for secondary vulcanization.

Japan Kokai 5-9388 or CA 2071787A discloses the addition of NC—$(CH_2)_n$—CN to a silicone rubber composition to a silicone rubber having minimized compression set. However, because of the harmful nature of NC—$(CH_2)_n$—CN, the resulting silicone rubber is only adapted to a limited use.

Japan Kokai 4-139258 corresponding to CA 2052410A and EP477984A discloses crosslinking between an organopolysiloxane having alkenyl groups at its side chains and an organohydrogenpolysiloxane having SiH groups at both ends thereby obtaining a silicone rubber having minimized compression set. However, this would often cause insufficient curing and give inferior physical properties of the resulting silicone rubber.

SUMMARY OF THE INVENTION

An object of the present invention is to provide a high compression resistance silicone rubber composition which can be molded and cured into silicone rubber parts exhibiting high compression resistance without a need for secondary vulcanization.

Another object of the present invention is to provide a method of vulcanizing a silicone rubber composition for providing a silicone rubber having minimized compression set without secondary vulcanization.

The present invention is directed to a heat-curable silicone rubber composition comprising (a) an organopolysiloxane having at least two alkenyl groups each bonded to a silicon atom in a molecule, (b) an organohydrogenpolysiloxane having at least two hydrogen atoms each bonded to a silicon atom in a molecule, and (c) a platinum catalyst. According to the present invention, the composition further includes (d) ammonia or an ammonia precursor which will generate ammonia through thermal decomposition or chemical reaction. By adding component (d) so that ammonia is present in an amount of 10 to 500 parts by weight of nitrogen per million parts by weight of the total of components (a), (b) and (c) upon vulcanization of the heat-curable silicone rubber composition, the cured product of the composition is minimized in compression. That is, the resulting silicone rubber has increased compression resistance without carrying out secondary vulcanization after curing.

Accordingly, one aspect of the present invention provides a heat-curable silicone rubber composition comprising (a) an organopolysiloxane having at least two alkenyl groups each bonded to a silicon atom in a molecule, (b) an organohydrogenpolysiloxane having at least two hydrogen atoms each bonded to a silicon atom in a molecule, (c) a platinum catalyst, and (d) ammonia or an ammonia precursor which will generate ammonia through thermal decomposition or chemical reaction, the ammonia or ammonia precursor being blended so that ammonia is present in an amount of 10 to 500 parts by weight of nitrogen per million parts by weight of the total of components (a), (b) and (c) in a cured product of the heat-curable silicone rubber composition.

Another aspect of the present invention provides a method of vulcanizing a heat-curable silicone rubber composition comprising (a) an organopolysiloxane having at least two alkenyl groups each bonded to a silicon atom in a molecule, (b) an organohydrogenpolysiloxane having at least two hydrogen atoms each bonded to a silicon atom in a molecule, and (c) a platinum catalyst characterized in that the composition is cured in the presence of ammonia in an amount of 10 to 500 parts by weight of nitrogen per million parts by weight of the total of components (a), (b) and (c) in a cured product thereof.

DETAILED DESCRIPTION OF THE INVENTION

The heat-curable silicone rubber composition of the present invention includes as major components (a) an organopolysiloxane having at least two alkenyl groups each bonded to a silicon atom in a molecule, (b) an organohydrogenpolysiloxane having at least two hydrogen atoms each bonded to a silicon atom in a molecule, and (c) a platinum catalyst. Components (a), (b), and (c) may be selected from known ones.

More particularly, the organopolysiloxane as component (a) is a main component of the curable silicone rubber composition and should have at least two alkenyl groups each bonded to a silicon atom in a molecule.

The organopolysiloxane (a) preferably has the following average compositional formula (1):

$$R_a^1 SiO_{(4-a)/2} \qquad (1)$$

wherein $R^1$ represents substituted or unsubstituted monovalent hydrocarbon groups, which may be identical or different, having 1 to 10 carbon atoms, preferably 1 to 8 carbon atoms, and letter a is a positive number of 1.5 to 2.8, preferably 1.8 to. 2.5.

Examples of the substituted or unsubstituted monovalent hydrocarbon groups each bonded to a silicon atom in a molecule represented by $R^1$ include alkyl groups such as methyl, ethyl, propyl, isopropyl, butyl, isobutyl, tert-butyl, pentyl, neopentyl, hexyl, cyclohexyl, octyl, nonyl and decyl, aryl groups such as phenyl, tolyl, xylyl and naphtyl, aralkyl groups such as benzyl, phenylethyl and phenylpropyl, alkenyl groups such as vinyl, allyl, propenyl, isopropenyl, butenyl, isobutenyl, hexenyl, cyclohexenyl and octenyl, and substituted ones of these groups wherein some or all of the hydrogen atoms are replaced by halogen atoms, for example, fluorine, bromine and chlorine, or cyano groups, such as chloromethyl, chloropropyl, bromoethyl, trifluoropropyl and cyanoethyl groups.

The organopolysiloxane should have at least two alkenyl groups preferably having 2 to 8 carbon atoms, more preferably having 2 to 6 carbon atoms. The amount of alkenyl group contained is preferably $1.0 \times 10^{-5}$ to 20 mol %, more preferably $1.0 \times 10^{-4}$ to 10 mol % of the entire organic groups bonded to silicon atoms in a molecule. The aliphatic unsaturated hydrocarbon groups may be bonded to silicon atoms at the terminals or the intermediate of the chain, although the organopolysiloxane preferably has at least two alkenyl groups bonded to silicon atoms at both terminals of the chain from the viewpoint of the curing rate of the composition and the properties of the cured product.

The organopolysiloxane (a) generally has a straight chain structure basically composed of the repeated diorganosiloxane units of $R_2^1SiO_{2/2}$ and end-blocked with triorganosiloxy units of $R_3^1SiO_{1/2}$ or both ends although it may partially have branching structure, i.e. mono-organosiloxane units of $R^1SiO_{3/2}$ or may be cyclic in molecular structure. Its molecular weight is not critical. Liquid ones having a low viscosity to raw rubber-like ones having a high viscosity are acceptable although organopolysiloxanes having a viscosity of at least 100 centipoises, usually having 100 to 1,000,000 centipoises, preferably 1,000 to 100,000 centipoises at 25° C. are preferred in order that they cure into rubbery elastomers.

The organohydrogenpolysiloxane as component (b) is a crosslinking agent for the curable silicone rubber composition of the invention. In the presence of a platinum catalyst as component (c), addition reaction occurs between a hydrogen atom bonded to a silicon atom, i.e. SiH group in component (b) and an alkenyl group bonded to a silicon atom in component (a), inducing crosslinking and curing.

The organohydrogenpolysiloxane as component (b) should have at least two, preferably 2 to 100, more preferably 3 to 50 hydrogen atoms each bonded to a silicon atom in a molecule.

The organohydrogenpolysiloxane (b) preferably has the following average compositional formula (2):

$$R_b^2H_cSiO_{(4-b-c)/2} \qquad (2)$$

wherein $R^2$ represents a substituted or unsubstituted monovalent hydrocarbon group, which may be identical or different, having 1 to 10, preferably 1 to 8 carbon atoms, and letters b and c are positive numbers satisfying the following ranges: $1.5 \leq b \leq 2.8$, preferably $1.6 \leq b \leq 2.5$, $0.003 \leq c \leq 1.0$, preferably $0.02 \leq c \leq 1.0$, and $1.5 < b+c \leq 3.0$, preferably $1.6 \leq b+c \leq 2.8$.

The monovalent hydrocarbon groups preferably do not have aliphatic unsaturated bonds. Examples of the substituted or unsubstituted monovalent hydrocarbon groups each bonded to a silicon atom in a molecule represented by $R^2$ can be cited as those of $R^1$ described above and include alkyl groups such as methyl, ethyl, propyl, isopropyl, butyl, isobutyl, tert-butyl, pentyl, neopentyl, hexyl, cyclohexyl, octyl, nonyl and decyl, aryl groups such as phenyl, tolyl, xylyl and naphtyl, aralkyl groups such as benzyl, phenylethyl and phenylpropyl, alkenyl groups such as vinyl, allyl, propenyl, isopropenyl, butenyl, isobutenyl, hexenyl, cyclohexenyl and octenyl, and substituted ones of these groups wherein some or all of the hydrogen atoms are replaced by halogen atoms, for example, fluorine, bromine and chlorine, or cyano groups, such as chloromethyl, chloropropyl, bromoethyl, trifluoropropyl and cyanoethyl groups.

The organopolysiloxane generally has a straight chain structure basically composed of the repeated difunctional siloxane units ($=SiO_{2/2}$) and having monofunctional siloxane units ($\equiv SiO_{1/2}$) at both ends although it may be a branched, cyclic or three-dimensional network structure.

The hydrogen atoms directly bonded to silicon atoms (SiH groups) may be bonded to silicon atoms at the terminal or the intermediate of the chain. Its molecular weight is not critical although it should preferably have a viscosity of 1 to 10,000 centipoises, particularly 3 to 1,000 centipoises at 25° C.

Component (b) is preferably blended such that the moles of the hydrogen atom bonded to a silicon atom and the moles of the alkenyl group bonded to a silicon atom are in a ratio of from 0.5:1 to 20:1 more preferably from 1:1 to 3:1. Curable organopolysiloxane compositions wherein less than 0.5 mole of the hydrogen atom bonded to a silicon atom is present per mole of the alkenyl group bonded to a silicon atom would not thoroughly cure. Curable organopolysiloxane compositions wherein more than 20 moles of the hydrogen atom bonded to a silicon atom is present per mole of the alkenyl group bonded to a silicon atom would expand.

Component (c) is a platinum catalyst for curing the curable silicone rubber composition. Examples of the platinum catalyst include chloroplatinic acid, alcohol solutions of chloroplatinic acid, complexes of chloroplatinic acid with olefins, platinum black, and platinum carried on supports. The platinum catalyst is preferably added such that there is available 0.1 to 500 parts, more preferably 1 to 50 parts by weight of platinum per million parts by weight of components (a) and (b) combined. Less than 0.1 ppm of platinum would be insufficient for curing to proceed whereas more than 500 ppm of platinum is uneconomical.

According to the present invention, (d) ammonia or an ammonia precursor which will generate ammonia through thermal decomposition or chemical reaction is blended in a silicone rubber composition comprising components (a), (b), and (c). The component (d) is blended so that the component (d) is present in an amount of 10 to 500 parts, preferably 20 to 200 parts by weight calculated as nitrogen per million parts by weight of components (a), (b) and (c) combined in the cured product of the composition. When ammonia or ammonia precursor is blended in such amounts, $NH_3$, which is otherwise a poison to the catalyst for addition reaction, functions to reduce compression set without affecting curability.

Any of the ammonia precursors which will generate ammonia through thermal decomposition or chemical reaction within the system may be used. Typical examples are inorganic ammonium salts such as ammonium acetate, ammonium chloride, ammonium hydroxide, ammonium sulfate, and ammonium carbonate, organic nitrogen compounds such as urea, organosilazane compounds, for

example, organodisilazanes such as hexamethyldisilazane and divinyltetramethyldisilazane.

In addition to the above components, the silicone rubber composition of the present invention may have blended therein any of various additives which are conventionally blended in this type of composition.

Typically, a filler such as pulverized quartz, diatomaceous earth, calcium carbonate, alumina, carbon black and reinforcing silica powder can be blended in order to impart strength to a silicone rubber. Examples of reinforcing fillers include hydrophilic silicas such as Aerosil 130, 200 and 300 manufactured by Japan Aerosil K.K. and Degussa, Cabosil MS-5 and MS-7 manufactured by Cabot, Rheorosil QS-102 and 103 manufactured by Tokuyama Sada K.K. and Nipsil LP manufactured by Nippon Silica K.K., and hydrophobic silicas such as Aerosil R-812, R-812S, R-972 and R-974 manufactured by Degussa, Rheorosil MT-10 manufactured by Tokuyama Soda K.K. and Nipsil SS series manufactured by Nippon Silica K.K.

The filler may be blended in an amount of 10 to 150 parts by weight per 100 parts by weight of components (a), (b) and (c) combined.

An agent for controlling curing time may also be blended. Examples of the control agent include vinyl group-containing organopolysiloxane (such as vinylcyclotetrasiloxane), triallylisocyanurate, alkyl maleate, acetylene alcohol (such as ethynylcyclohexanol), silane or siloxane-modified acetylene alcohol, hydroperoxide, tetramethyl ethylenediamine, benzotriazole and mixtures thereof.

In addition, coloring agents including inorganic pigments (such as cobalt blue) and organic dyes, flame retardants (such as cerium oxide, zinc carbonate, manganese carbonate, red oxide and titanium oxide) may be optionally blended.

The silicone rubber composition of the invention may be prepared in a conventional manner. Ammonia or ammonia precursor may be added at any stage.

More specifically, the silicone rubber composition is prepared by at first mixing the organopolysiloxane (a) and a filler for 10 minutes to 8 hours at room temperature (for example, 10° to 30° C.) to 280° C., preferably 80° to 200° C. and then adding to the mixture the organohydrogenpolysiloxane (b) and the platinum catalyst (c) at room temperature (usually 10° to 30° C.). Ammonia or the ammonia precursor is added with the organosiloxane (a) and the filler or with the organohydrogenpolysiloxane (b) and the platinum catalyst (c). In the former case, ammonia or the ammonia precursor may be added in a larger amount over 10 to 500 ppm as nitrogen atom per the total amount of components (a), (b) and (c) because ammonia would be evaporated away in the mixing step for 10 minutes to 8 hours at room temperature (for example, 10° to 30° C.) to 280° C., preferably 80° to 200° C. Ammonia or the ammonia precursor may also be added to the composition prepared including components (a), (b) and (c) as well as the filler or other agents before curing.

Ammonia should be left in an amount of 10 to 500 ppm as nitrogen atom in the composition at the curing step to prepare a cured product (silicone rubber) having minimized compression set without a need for secondary vulcanization. If ammonia is over the upper limit, curing would be adversely affected. If the amount of ammonia is lower than the lower limit, the object of the present invention cannot be attained.

The silicone rubber composition is generally cured by primarily vulcanizing at room temperature, for example, 10° to 30° C. to about 250° C. for about ten seconds to about 120 minutes. The resulting cured product is minimized in compression set without secondary vulcanization. This eliminates a need for secondary vulcanization after curing.

There has been described a heat-curable silicone rubber composition which can be molded and cured into silicone rubber parts having minimized compression set without secondary vulcanization. The resulting silicone rubber parts are well suited as roll members, connectors for automotive parts, packing keyboards on microwave ovens and microwave jars, watch parts, camera parts, and O-rings.

EXAMPLE

Examples of the invention are given below by way of illustration and not by way of limitation. All parts are by weight.

Example 1

A liquid silicone rubber base was prepared by agitating 100 parts of a dimethylpolysiloxane (A) blocked with a dimethylvinylsiloxy group at either end and having a viscosity of 10,000 centistokes at 25° C., 40 parts of wet silica (Nipsil LP, Nippon Silica Industry K.K.), 3 parts of hexamethyldisilazane, and 1 part of water in a kneader mixer at room temperature, i.e. at 25° C. for 1 hour, then heating to an internal temperature of 150° C., and continuing agitation for a further 3 hours.

To 100 parts of the liquid silicone rubber base were added 30 parts of the same dimethylpolysiloxane (A) as above, 1.1 parts of a methylhydrogenpolysiloxane consisting of dimethylsiloxane-methylhydrogensiloxane copolymer (B) of the following formula having a viscosity of 15 centistokes at 25° C. as a crosslinking agent, 0.1 part of a 1% isopropyl alcohol solution of chloroplatinic acid, and 0.05 part of ethynyl cyclohexanol as a reaction control agent. The ingredients were uniformly mixed.

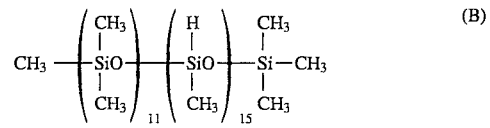

The composition was cured at 150° C. while it was examined for curing using a rheometer. The results are shown in Table 1. T10 and T90 are times taken until the torque reaches 10% and 90% of the torque recorded after 2 minutes of curing, respectively. Separately, the composition was press molded at 120° C. for 10 minutes into a rubber sheet of 2 mm gage. The rubber sheet was measured for residual nitrogen and various physical properties. The sheet was subject to a compression set test at 150° C. for 22 hours according to JIS K-6301. The results are also shown in Table 1.

Example 2

A liquid silicone rubber base was prepared by agitating 100 parts of a dimethylpolysiloxane blocked with a dimethylvinylsiloxy group at either end and having a viscosity of 10,000 centistokes at 25° C., 40 parts of wet silica (Nipsil LP), and 3 parts of 29% aqueous ammonia in a kneader mixer at room temperature, i.e. at 25° C. for 1 hour, then heating to an internal temperature of 150° C., and continuing agitation for a further 3 hours. To 100 parts of the liquid silicone rubber base were added 300 parts of the dimethylpolysiloxane (A) used in Example 1, 1.1 parts of methylhydrogenpolysiloxane (B), 0.1 part of a 1% isopropyl alcohol solution of chloroplatinic acid, and 0.05 part of ethynyl cyclohexanol as a reaction control agent. There was obtained an addition type silicone rubber composition.

The composition was tested as in Example 1, with the results shown in Table 1.

Example 3

A liquid silicone rubber base was prepared by combining 100 parts of a dimethylpolysiloxane blocked with a dimethylvinylsiloxy group at either end and having a viscosity of 10,000 centistokes at 25° C. with 40 parts of wet silica (Nipsil LP), 3 parts of dimethoxydimethylsilane, and 1 part of water and agitating the ingredients in a kneader mixer as in Example 1. To 100 parts of the liquid silicone rubber base were added 30 parts of the dimethylpolysiloxane (A) used in Example 1, 1.1 parts of methylhydrogenpolysiloxane (B), 0.1 part of a 1% isopropyl alcohol solution of chloroplatinic acid, and 0.05 part of ethynyl cyclohexanol as a reaction control agent. Thereafter, 0.0045 part of 29% aqueous ammonia was added thereto, obtaining an addition type silicone rubber composition.

The composition was tested as in Example 1, with the results shown in Table 1.

Example 4

A liquid silicone rubber base was prepared by combining 100 parts of a dimethylpolysiloxane blocked with a dimethylvinylsiloxy group at either end and having a viscosity of 10,000 centistokes at 25° C. with 40 parts of wet silica (Nipsil LP), 3 parts of dimethoxydimethylsilane, 1 part of water, and 5 parts of ammonium carbonate and agitating the ingredients in a kneader mixer as in Example 1. To 100 parts of the liquid silicone rubber base were added 30 parts of the dimethylpolysiloxane (A) used in Example 1, 1.1 parts of methylhydrogenpolysiloxane (B), 0.1 part of a 1% isopropyl alcohol solution of chloroplatinic acid, and 0.05 part of ethynyl cyclohexanol as a reaction control agent. There was obtained an addition type silicone rubber composition.

The composition was tested as in Example 1, with the results shown in Table 1.

Example 5

A liquid silicone rubber base was prepared by agitating 100 parts of a dimethylpolysiloxane blocked with a dimethylvinylsiloxy group at either end and having a viscosity of 10,000 centistokes at 25° C. with 40 parts of fumed silica having a specific surface area of 200 $m^2/g$, 6 parts of hexamethyldisilazane, and 2 parts of water in a kneader mixer at room temperature, i.e. at 25° C. for 1 hour, then heating to an internal temperature of 150° C., and continuing agitation for a further 3 hours. To the mixture was added 2 parts of aqueous ammonia. With agitation continued, the mixture was cooled down to room temperature. To 100 parts of the liquid silicone rubber base were added 30 parts of the dimethylpolysiloxane (A) used in Example 1, 1.1 parts of methylhydrogenpolysiloxane copolymer (B), 0.1 part of a 1% isopropyl alcohol solution of chloroplatinic acid, and 0.05 part of ethynyl cyclohexanol as a reaction control agent. There was obtained an addition type silicone rubber composition.

The composition was tested as in Example 1, with the results shown in Table 1.

Example 6

A liquid rubber compound base was prepared by mixing 100 parts of a dimethylpolysiloxane blocked with a dimethylvinylsiloxy group at either end and having a viscosity of 10,000 centistokes at 25° C. with 40 parts of wet silica (Nipsil LP), 1.5 parts of hexamethyldisilazane, and 0.5 part of water in a Henschel mixer for 10 minutes, transferring the mixture to a twin roll continuous milling extruder, and extruding at an internal temperature of 200° C. for a residence time of 80 to 100 seconds. A crosslinking agent, catalyst and reaction control agent were added to the liquid rubber compound base as in Example 1, obtaining an addition type silicone rubber composition.

The composition was tested as in Example 1, with the results shown in Table 1.

Comparative Example 1

A rubber compound base was prepared by agitating 100 parts of a dimethylpolysiloxane blocked with a dimethylvinylsiloxy group at either end and having a viscosity of 10,000 centistokes at 25° C., 40 parts of wet silica (Nipsil LP), 3 parts of dimethoxydimethylsilane, and 1 part of water in a kneader mixer at room temperature, i.e. at 25° C. for 1 hour, then heating to an internal temperature of 150° C., and continuing agitation for a further 3 hours. To 100 parts of the rubber compound base were added 30 parts of the dimethylpolysiloxane (A) used in Example 1, 1.1 parts of methylhydrogenpolysiloxane (B), 0.1 part of a 1% isopropyl alcohol solution of chloroplatinic acid, and 0.05 part of ethynyl cyclohexanol as a reaction control agent. There was obtained an addition type silicone rubber composition.

The composition was tested as in Example 1, with the results shown in Table 1.

Comparative Example 2

A liquid rubber compound base was prepared by agitating 100 parts of a dimethylpolysiloxane blocked with a dimethylvinylsiloxy group at either end and having a viscosity of 10,000 centistokes at 25° C., 40 parts of wet silica (Nipsil LP), 3 parts of hexamethyldisilazane, and 1 part of water in a kneader mixer at room temperature, i.e. at 25° C. for 1 hour, then heating to an internal temperature of 110° C., and continuing agitation at 100° C. for a further 1 hour.

To 100 parts of the liquid rubber compound base were added 30 parts of the dimethylpolysiloxane (A) used in Example 1, 1.1 parts of methylhydrogenpolysiloxane (B), 0.1 part of a 1% isopropyl alcohol solution of chloroplatinic acid, and 0.05 part of ethynyl cyclohexanol as a reaction control agent. There was obtained an addition type silicone rubber composition.

The composition was tested as in Example 1, with the results shown in Table 1.

Comparative Example 3

A liquid rubber compound base was prepared by agitating 100 parts of a dimethylpolysiloxane blocked with a dimethylvinylsiloxy group at either end and having a viscosity of 10,000 centistokes at 25° C., 40 parts of wet silica (Nipsil LP), 3 parts of hexamethyldisilazane, and 1 part of water in a kneader mixer at room temperature, i.e. at 25° C. for 1 hour, then heating to an internal temperature of 150° C., and continuing agitation for a further 18 hours.

To 100 parts of the liquid rubber compound base were added 30 parts of the dimethylpolysiloxane (A) used in Example 1, 1.1 parts of methylhydrogenpolysiloxane (B), 0.1 part of a 1% isopropyl alcohol solution of chloroplatinic acid, and 0.05 part of ethynyl cyclohexanol as a reaction control agent. There was obtained an addition type silicone rubber composition.

The composition was tested as in Example 1, with the results shown in Table 1.

Comparative Example 4

A liquid rubber compound base was prepared by adding 40 parts of fumed silica having a specific surface area of 200 m²/g, 6 parts of hexamethyldisilazane, and 2 parts of water to 100 parts of a dimethylpolysiloxane blocked with a dimethylvinylsiloxy group at either end and having a viscosity of 10,000 centistokes at 25° C., agitating the ingredients at room temperature, i.e. at 25° C. for 1 hour, then heating to temperature of 150° C., and continuing agitation for a further 3 hours.

To 100 parts of the liquid rubber compound base were added 30 parts of the dimethylpolysiloxane (A) used in Example 1, 1.1 parts of methylhydrogenpolysiloxane (B), 0.1 part of a 1% isopropyl alcohol solution of chloroplatinic acid, and 0.05 part of ethynyl cyclohexanol as a reaction control agent. There was obtained an addition type silicone rubber composition.

The composition was tested as in Example 1, with the results shown in Table 1.

Comparative Example 5

A rubber compound base was prepared by charging a kneader mixer with 80 parts of a dimethylpolysiloxane blocked with a trivinylsiloxy group at either end and having a viscosity of 10,000 centistokes at 25° C., 20 parts of a dimethylpolysiloxane blocked with a dimethylvinylsiloxy group at either end and having a viscosity of 10,000 centistokes at 25° C., 40 parts of wet silica (Nipsil LP), 3 parts of hexamethyldisilazane, and 1 part of water, agitating the ingredients at room temperature, i.e. at 25° C. for 1 hour, then heating to a temperature of 150° C., and continuing agitation for a further 3 hours. To 100 parts of the rubber compound base were added 30 parts of the dimethylpolysiloxane (A) used in Example 1 and 0.6 part of t-butylperoxyisopropyl carbonate, obtaining a peroxide curing type silicone rubber composition.

The composition was tested as in Example 1, with the results shown in Table 1.

Comparative Example 6

Comparative Example 5 was repeated except that hexamethyldisilazane was replaced by dimethoxydimethylsilane.

The composition was tested as in Example 1, with the results shown in Table 1.

TABLE 1

|  | Example | | | | | | Comparative Example | | | | | |
| --- | --- | --- | --- | --- | --- | --- | --- | --- | --- | --- | --- | --- |
|  | 1 | 2 | 3 | 4 | 5 | 6 | 1 | 2 | 3 | 4 | 5 | 6 |
| Curability |
| T10 (sec.) | 24 | 27 | 26 | 25 | 26 | 27 | 25 | 31 | 26 | 22 | 41 | 43 |
| T90 (sec.) | 39 | 40 | 41 | 42 | 35 | 44 | 40 | 62 | 40 | 33 | 86 | 85 |
| Hardness JIS A scale | 48 | 50 | 52 | 49 | 41 | 53 | 52 | 52 | 48 | 41 | 51 | 53 |
| Tensile strength (kgf/cm²) | 70 | 62 | 58 | 61 | 89 | 60 | 59 | 61 | 72 | 90 | 72 | 61 |
| Elongation (%) | 320 | 280 | 250 | 280 | 500 | 220 | 240 | 250 | 310 | 520 | 320 | 250 |
| Compression set (%) | 13 | 15 | 19 | 16 | 20 | 16 | 36 | 39 | 35 | 48 | 29 | 31 |
| Residual N in the cured product (ppm) | 80 | 60 | 110 | 50 | 120 | 180 | 1> | 700 | 8 | 4 | 60 | 1> |
| Residual N (ppm) per the total weight of components (a), (b) and (c) after curing | 63 | 47 | 86 | 39 | 94 | 141 | 1> | 547 | 6 | 3 | 47 | 1> |

Japanese Patent Application No. 5-285787 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A heat-curable silicone rubber composition comprising
   (a) an organopolysiloxane having at least two alkenyl groups each bonded to a silicon atom in a molecule,
   (b) an organohydrogenpolysiloxane having at least two hydrogen atoms each bonded to a silicon atom in a molecule,
   (c) a platinum catalyst, and
   (d) ammonia or an ammonia precursor which will generate ammonia through thermal decomposition or chemical reaction, said ammonia or ammonia precursor being blended so that ammonia is present in an amount of 20 to 200 parts by weight of nitrogen per million parts by weight of the total of components (a), (b) and (c) in a cured product of the heat-curable silicone rubber composition.

2. A method of vulcanizing a heat-curable silicone rubber composition comprising (a) an organopolysiloxane having at least two alkenyl groups each bonded to a silicon atom in a molecule, (b) an organohydrogenpolysiloxane having at least two hydrogen atoms each bonded to a silicon atom in a molecule, and (c) a platinum catalyst wherein the composition is cured in the presence of ammonia in an amount of 20 to 200 parts by weight of nitrogen per million parts by weight of the total of components (a), (b) and (c).

3. The method of claim 2 wherein secondary vulcanization is omitted.

4. A heat-curable silicone rubber composition comprising (a) an organopolysiloxane having at least two alkenyl groups each bonded to a silicon atom in a molecule and having the following average compositional formula (1):

$$R_a^1 SiO_{(4-a)/2} \qquad (1)$$

wherein $R^1$ represents substituted or unsubstituted monovalent hydrocarbon groups, which are identical or different, having 1 to 10 carbon atoms and letter a is a positive number of 1.5 to 2.8, (b) an organohydrogenpolysiloxane having at least two hydrogen atoms each bonded to a silicon atom in a molecule, (c) a platinum catalyst, and (d) ammonia or an ammonia precursor which will generate ammonia through thermal decomposition or chemical reaction, said ammonia or ammonia precursor being blended so that ammonia is present in an amount of 20 to 200 parts by weight of nitrogen per million parts by weight of the total of components (a), (b) and (c) in a cured product of the heat-curable silicone rubber composition.

5. A composition according to claim 4, wherein the organohydrogenpolysiloxane (b) has the following average compositional formula (2):

$$R_b^2 H_c SiO_{(4-b-c)/2} \qquad (2)$$

wherein $R^2$ represents a substituted or unsubstituted monovalent hydrocarbon group, which may be identical or different, having 1 to 10, preferably 1 to 8 carbon atoms, and letters b and c are positive numbers satisfying the following ranges: $1.5 \leq b \leq 2.8$, $0.003 \leq c \leq 1.0$, and $1.5 < b+c \leq 3.0$.

6. A composition according to claim 5, wherein $1.6 \leq b \leq 2.5$, $0.02 \leq c \leq 1.0$, and $1.6 \leq b+c \leq 2.8$.

7. A composition according to claim 4, wherein the monovalent hydrocarbon groups $R^1$ are alkyl, aryl, aralkyl or alkenyl, each optionally substituted by halogen or cyano.

8. A composition according to claim 4, wherein the monovalent hydrocarbon groups $R^2$ are alkyl, aryl, aralkyl or alkenyl, each optionally substituted by halogen or cyano.

9. A composition according to claim 5, wherein the organohydrogenpolysiloxane (b) is present in an amount such that the molar ratio of hydrogen atoms bound to silicon atoms to alkenyl groups bound to silicon atoms in (a) is 0.5:1 to 20:1.

10. A composition according to claim 4, wherein the platinum catalyst is chloroplatinic acid, an alcohol solution of chloroplatinic acid, a complex of chloroplatinic acid with an olefin, platinum black, or platinum carried on a support.

11. A composition according to claim 10, wherein the catalyst is present in an amount of 0.1 to 500 parts by weight of Pt based on (a) and (b) combined.

12. A composition according to claim 4, wherein the ammonia precursor is an inorganic ammonium salt, an organic nitrogen compound, or an organosilazane compound.

13. A composition according to claim 4, wherein the ammonia precursor is ammonium acetate, ammonium chloride, ammonium hydroxide, ammonium sulfate, ammonium carbonate, urea, hexamethyldisilazane or divinyltetramethyldisilazane.

14. A silicone rubber composition comprising a cured mixture of (a) an organopolysiloxane having at least two alkynyl groups each bonded to a silicon atom in a molecule and having the following average compositional formula (1):

$$R_a^1 SiO_{(4-a)/2} \qquad (1)$$

wherein $R^1$ represents substituted or unsubstituted monovalent hydrocarbon groups, which are identical or different, having 1 to 10 carbon atoms and letter a is a positive number of 1.5 to 2.8, (b) an organohydrogenpolysiloxane having at least two hydrogen atoms each bonded to a silicon atom in a molecule, (c) a platinum catalyst, and (d) ammonia or an ammonia precursor which will generate ammonia through thermal decomposition or chemical reaction, said ammonia or ammonia precursor being blended so that ammonia is present in an amount of 20 to 200 parts by weight of nitrogen per million parts by weight of the total of components (a), (b) and (c) in the cured composition.

* * * * *